A. J. & J. FINK.
Apparatus for Cooling Beer on Draft.

No. 147,924. Patented Feb. 24, 1874.

Witnesses,
J. Sherborne Singer
Thomas McIlvain

A. J. Fink and J. Fink
by their Attys.
Howson and Son.

UNITED STATES PATENT OFFICE.

ANDREW J. FINK AND JOHN FINK, OF READING, PENNSYLVANIA.

IMPROVEMENT IN APPARATUS FOR COOLING BEER ON DRAFT.

Specification forming part of Letters Patent No. 147,924, dated February 24, 1874; application filed November 3, 1873.

*To all whom it may concern:*

Be it known that we, ANDREW J. FINK and JOHN FINK, of the city of Reading, county of Berks, State of Pennsylvania, have invented Improvements in Beer-Cooling Apparatus, of which the following is a specification:

The objects of our invention are to cool beer and other liquor in barrels or kegs more thoroughly, and with a less expenditure of ice than usual, and to maintain the cooling apparatus in a comparatively dry condition.

Figure 1:
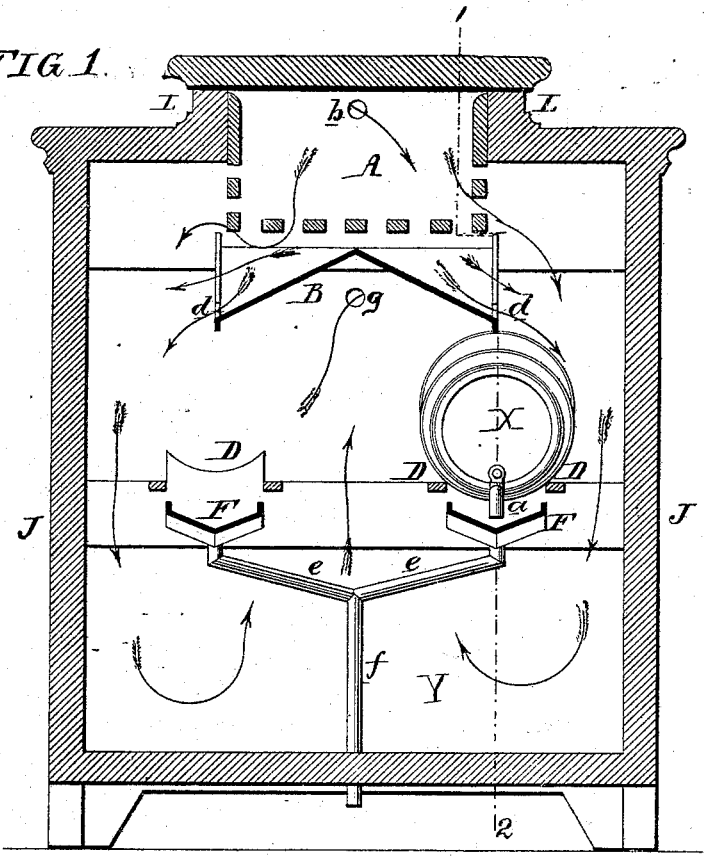

We attain these objects, first, by combining an ice-box, A, inclined deflector B, skids D, and drip-catchers F, in the manner best observed in the sectional elevation, Fig. 1, of the accompanying drawing, so that the drippings from the said ice-box shall be directed onto barrels or kegs resting upon the skids, while at the same time a constant circulation of cold air is kept up around the kegs. Detachable sliding blocks H, at the front of the cooling apparatus, are so arranged in respect to the doors K and spigots $a$ of the beer-kegs as to permit the latter to be readily removed and replaced, access being thus obtained to the interior of the apparatus without disturbing the kegs. (See front elevation, Fig. 2.)

The casing of the apparatus consists of a large box, J, having hinged doors K and K' at the front, through which access is obtained to the interior, and a raised portion, L, at the top, from which is suspended the ice-box A, the latter having a slatted or perforated bottom and sides, so as to permit the free discharge of the drippings and the downward passage of air, which enters the apparatus through an opening, $b$, and is cooled by passing through the ice. Beneath the ice-box there is a double-inclined drip-catcher or deflector, B, similar to that described in a separate application which we have made for a patent for a refrigerator, except that it has no continuous gutters at its opposite edges, the latter being downwardly inclined in both directions, toward an outlet, $d$, as best observed in the transverse vertical section, Fig. 3, on the line 1 2, Fig. 1. The drippings from the ice-box flow down the inclined surfaces of the deflector, and drop from the outlets $d$, onto the beer-kegs X, which rest in an inclined position upon skids D, extending transversely across the apparatus. The said drippings, after flowing over the surfaces of the kegs, drop from the bottom of the same into spouts F, communicating with the branches $e$ of an outlet-pipe, $f$.

The beer or other liquor in the kegs X is drawn off, as required, through spigots $a$, which project from the front of the apparatus, and the said liquor is cooled, not only by the drippings of the ice-box, as above described, but also by currents of cold air which pass through the apparatus and around the kegs, to the outlet $g$, in the course indicated by the arrows in Fig. 1.

Kegs of liquor may also be placed in the lower compartments Y of the apparatus, and be thus partially cooled by the air-currents before they are mounted upon the skids.

Figures 2, 3, 4:
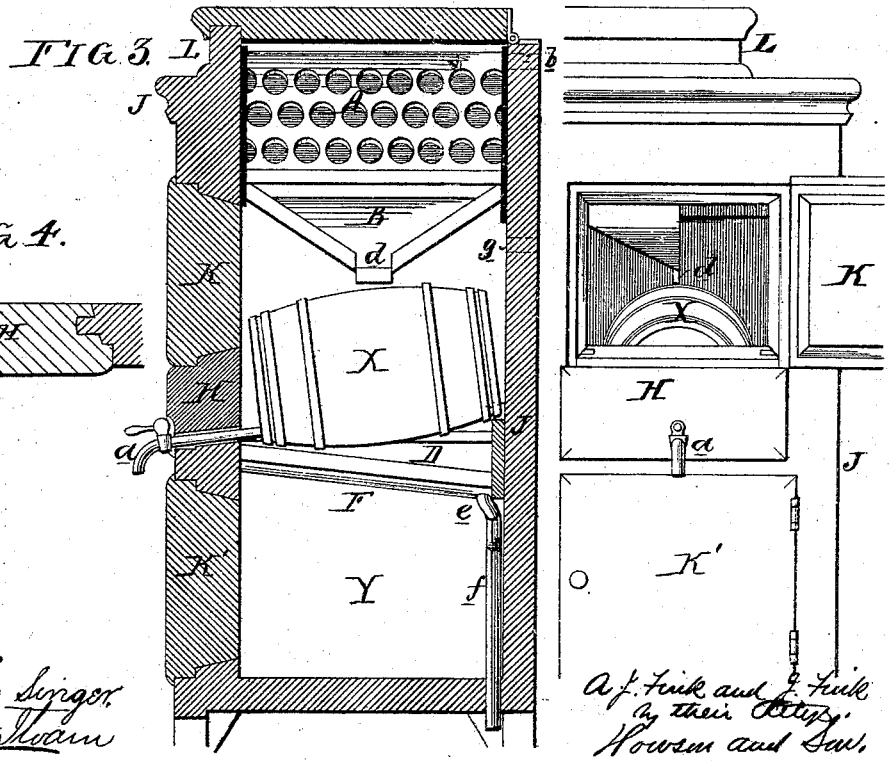

In order to permit ready access to the interior of the apparatus, and the ready introduction and removal of the kegs with the spigots attached to them, we combine detachable sliding blocks H with the hinged doors K, in the manner shown in Figs. 2 and 3, and in the detached sectional plan, Fig. 4. These blocks are adapted to guides on the opposite edges of the openings in front of the apparatus, and are slotted on their under sides, so as to fit snugly over the necks of the spigots. When adjusted, as shown, they aid in holding the kegs in place, and without interfering with the opening and closing of the doors K; and, when the kegs have been emptied, they may be removed after simply opening the doors K and lifting the said sliding blocks from their places.

We claim as our invention—

The combination, in a beer-cooler, of an ice-box, A, plate B, inclined downward from the center toward each edge, skids D D, directly below the lower edges of the plate B, and openings $b$ $g$, arranged as described, so that the air shall pass through the ice-box, round each keg on the skids, and upward between the kegs, as set forth.

In testimony whereof we have signed our names to this specification in the presence of two subscribing witnesses.

ANDREW JACKSON FINK.
JOHN FINK.

Witnesses:
WM. B. SCHOENER,
JOSEPH HOCH.